Dec. 14, 1965  W. BAUMGARTNER  3,223,321
PORTABLE HOUSEHOLD BUDGET COMPUTER
Filed March 16, 1965  3 Sheets-Sheet 1

INVENTOR.
WALTER BAUMGARTNER
BY
William C. Bobcock
ATTORNEY

Dec. 14, 1965  W. BAUMGARTNER  3,223,321
PORTABLE HOUSEHOLD BUDGET COMPUTER
Filed March 16, 1965  3 Sheets-Sheet 2

INVENTOR.
WALTER BAUMGARTNER
BY
William C. Babcock
ATTORNEY

Dec. 14, 1965          W. BAUMGARTNER                3,223,321
                PORTABLE HOUSEHOLD BUDGET COMPUTER
Filed March 16, 1965                              3 Sheets-Sheet 3

INVENTOR.
WALTER BAUMGARTNER
BY
William C. Babcock
ATTORNEY

United States Patent Office 3,223,321
Patented Dec. 14, 1965

3,223,321
PORTABLE HOUSEHOLD BUDGET COMPUTER
Walter Baumgartner, 156 Westchester St.,
Anaheim, Calif.
Filed Mar. 16, 1965, Ser. No. 440,188
7 Claims. (Cl. 235—114)

The present invention relates generally to the field of computers, and more particularly to a portable household budget computer that may be used to indicate that portion of a total budget which has been spent, that portion of the total budget remaining to be spent, as well as spent and unspent portions of the budget allocated for major household expenditures.

Many housewives find it extremely difficult to handle a budget over a period of time, such as a month or two in a manner whereby certain income funds allocated for such major classes of monthly expenditures as food, clothing, utilities, rent, and the like are properly expended. Also, without extensive figuring and time-consuming computation, these same housewives seldom can be accurately sure just what funds are available for expenditure during a particular budget period.

A major object of the present invention is to provide a compact, lightweight and portable, accurate household budget computer which may easily be carried for quick and convenient reference in a woman's handbag.

Another object of the invention is to furnish a household budget computer of relatively simple mechanical structure that can be fabricated from standard, commercially available materials, requires little or no maintenance attention, and can be retailed at a sufficiently low price as to encourage its widespread use.

While the present invention is particularly adapted for household accounting, it may also be used for check book accounts, inventory stock accounts, and other uses involving adjustable subtraction and addition.

These and other objects and advantages of the present invention will become apparent from the following description of a number of forms thereof, and from the accompanying drawings illustrating those forms, in which:

FIGURE 3 is a combined transverse cross-sectional and bottom plan view of the computer, taken on the line 3—3 of FIGURE 2;

Figure 8:
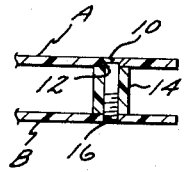
FIGURE 8 is a fragmentary, vertical cross-sectional view of the preferred form of the device, taken on the line 8—8 of FIGURE 1.

Referring now to FIGURES 1–3 and 5 for the general arrangement of the preferred form of the computer, it will be seen to include two parallel first and second plates A and B, respectively. The plates A and B are removably held together in a desired spaced relationship by a number of screws 10 shown in FIGURE 8, that extend downwardly through bores 12 formed in the first plate A, and thereafter project downwardly through cylindrical spacers 14 which rest in the upper surface of the plate B. The screws 10 extend downwardly beyond the cylindrical spacers 14 to engage tapped bores 16 formed in the second plate B.

Figure 1:
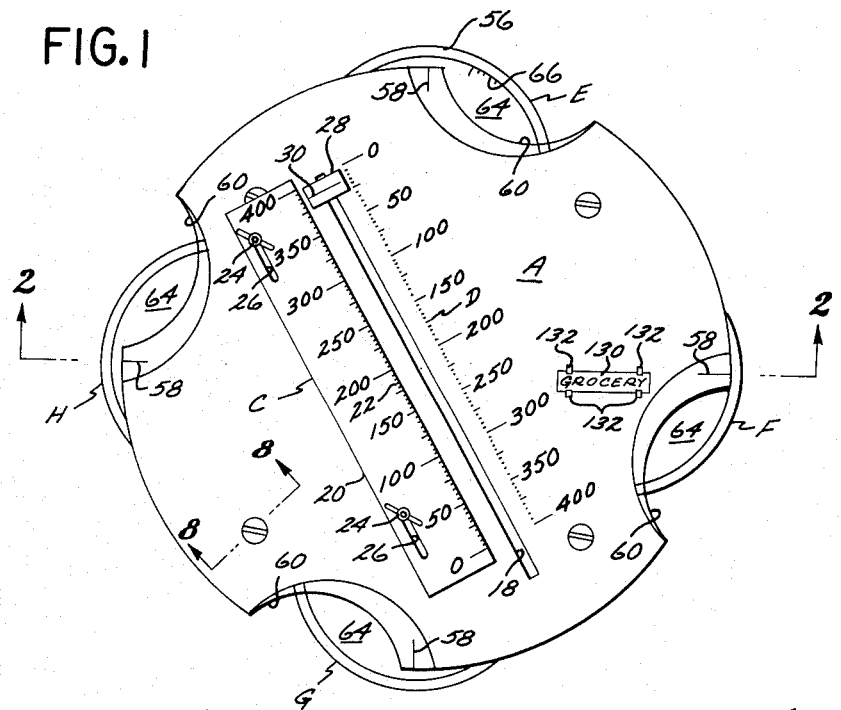
FIGURE 1 is a top plan view of a preferred form of the computer.

A diametrically extending slot 18 is formed in the first plate A, as can best be seen in FIGURE 1. A first graduated scale C is provided that is defined by an elongate sheet 20 in which a number of graduations 22 extend along one longitudinal side thereof, ranging from zero to the amount in dollars which comprises the total budgeted expenditure for a particular period of time. As illustrated in FIGURE 1, and presented only as an example, the graduations 22 on the sheet 20 range from zero to 400, with 400 being the total amount of money available for expenditure over a certain period of time.

Sheet 20 is removably held on the upper surface of plate A by two thumb screws 24 which project downwardly through elongate slots 26 formed in the sheet. The threads of screws 24 engage tapped bores (not shown) formed in plate A. By loosening the screws 24, the sheet 20 can be slid longitudinally relative to the first plate A for reasons to be explained hereinafter. After sheet 20 has been slid into the desired position, it is so held on plate A by tightening of screws 24 which grip the sheet 20 between the heads thereof and the upper surface of the plate.

A graduated scale D is imprinted on the upper surface of plate A, and is so situated thereon that the slot 18 is located intermediate the scales D and C as shown in FIGURE 1. The scale D is numbered in reverse to scale C. Scale D is used to indicate the amount of the total budget already spent. A small rectangular block 28 is provided (FIGURE 1) on which a reference line 30 is imprinted. As the block 28 moves longitudinally relative to slot 18 the reference line 30 may be concurrently brought into alignment with the graduations on the scales C and D for the purpose above mentioned.

Figure 2:
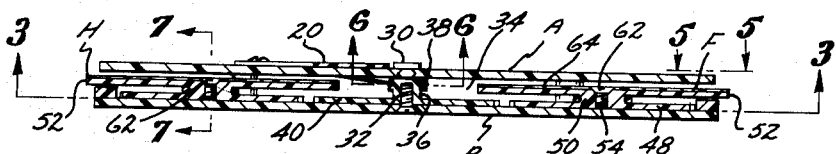
FIGURE 2 is a transverse cross-sectional view of the computer shown in FIGURE 1, taken on the line 2—2 thereof.
Figure 6:
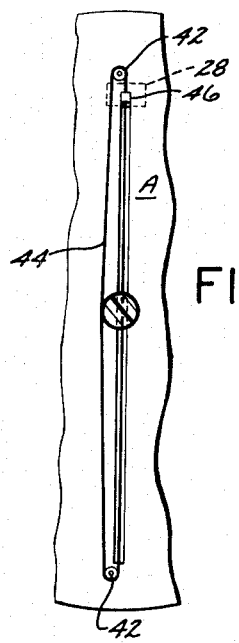
FIGURE 6 is a fragmentary bottom plan view of the preferred form of the computer, taken on the line 6—6 of FIGURE 2.
Figure 7:
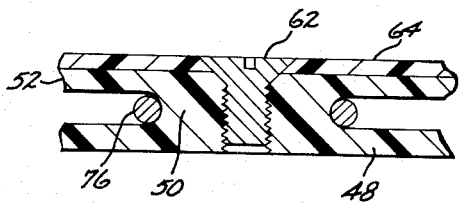
FIGURE 7 is a fragmentary vertical cross-sectional view of the preferred form of the computer, taken on the line 7—7 of FIGURE 2.

A pin 32 is centrally disposed in second plate B that extends upwardly into a space 34 existing between the plates A and B. Pin 32 rotatably supports a hub 36 having a circumferentially grooved portion 38 formed in the upper end thereof. A flat gear 40 projects outwardly from the lower portion of the hub 36 and rests on the upper surface of the second plate B, as shown in FIGURE 2. Two diametrically spaced, small, grooved rollers 42 are supported by conventional means in the space 34 between the first and second plates A and B, as illustrated in FIGURE 6, and are movably engaged by an endless belt 44 that preferably comprises a tough thread or fine cord, and is looped at least once around the grooved portion 38 shown in FIGURE 2.

A small slide body 46 is rigidly affixed to the belt 44, and is slidable in the slot 18. The slide body 46 is also affixed to the under side of the block 28 shown in FIGURE 1 by conventional means. When the gear 40 is rotated, as will be explained later, the grooved portion 38 rotates concurrently therewith, and in so rotating, moves the belt 44 to cause the block 28 to be moved relative to the scales C and D (FIGURE 1).

Figure 5:
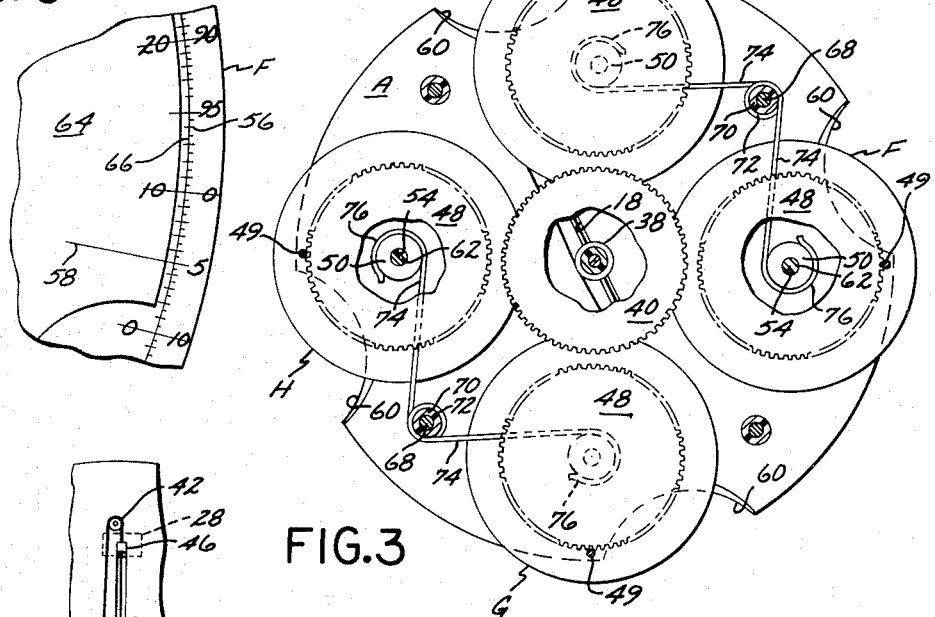
FIGURE 5 is a fragmentary top plan view of the preferred form of the device, taken on the line 5—5 of FIGURE 2.

In the preferred form of the invention shown in FIGURES 1–3 inclusive, four toothed circular members E, F, G, and H are provided, with the structure of these members being identical, as may be seen in FIGURE 2. The member F includes a flat gear 48 that has a hub 50 extending upwardly therefrom. A flat plate 52 projects outwardly from the upper end of hub 50. A tapped bore 54 extends downwardly in each hub 50. The outer circumferential portion of each plate 52 is provided with graduations 56 that can be rotated into alignment with reference lines 58 formed on the upper surface of the first plate A, as best seen in FIGURES 1 and 5.

The major portions of the circular members E, F, G, and H are situated within the confines of the space 34 (FIGURE 2). However, to permit access to the outer circumferential portions of the members E, F, G, and H, a number of pairs of aligned recesses 60 are preferably formed in the first and second plates A and B. Such access permits setting of the discs 64 later to be described, to the members E, F, G, and H for specific budgets of a desired monetary amount.

A number of screws 62 are supplied as shown in FIGURE 2 that engage the tapped bores 54 and extend through centrally disposed openings formed in circumferentially graduated discs 64 which rest on the upper surface of the plates 52. The graduations 66 on the discs 64 may be so oriented relative to the graduations 56 that the graduations 66 indicate the unspent portion of a certain portion of a household budget allocated to a major expense. When each screw 62 is tightened, it serves to frictionally hold one of the discs 64 in frictional engagement with the upper surfaces of one of the plates 52.

Two diametrically spaced screws 68 extend through the first and second plates A and B, and in so doing, hold cylindrical spacers 70 between these plates, as shown in FIGURE 3. Each spacer 70 is engaged by a loop 72 formed in a resilient wire, and this wire extends outwardly from each side of the loop to define two legs 74. Two hooks 76 are formed on the outer ends of legs 74, which hooks removably engage the hubs 50 of two of the members E, F, G, and H, as may be seen in FIGURES 2 and 3. The hooks 76 extend more than 180° around the hubs 50 to assure that the hubs will not be inadvertently displaced from the hooks during use of the computer. The hooks 76 permit rotational movement of the circular members E, F, G, and H, and due to the resiliency thereof, the legs 74 allow inward movement of the gears 48 relative to the gear 40.

When any one of the circular members E, F, G, or H is moved inwardly relative to the plates A and B, the gear 48 associated with that particular member is brought into engagement with the gear 40. Thereafter, when the inwardly disposed circular member E, F, G, or H is rotated, the grooved portion 38 is rotated to move the endless belt 44 to move the block 28 bearing the reference line 30 thereon relative to the scales C and D shown in FIGURE 1.

The plates E, F, G, and H or portions of the plate A adjacent thereto can be imprinted to designate the amount of money spent on various major expenses encountered in maintaining a household. As an example, the plate E may be selected for use in keeping the record of money expended on groceries, plate F the one for medical expenses, plate G for entertainment, and plate H for clothing.

The diameter of each of the gears 48 relative to the gear 40 is such, and the diameter of the grooved portion 38 is so related to the gear 40, that when one of the toothed circular members E, F, G, or H is moved inwardly and rotated the number of graduations 56 that are moved past one of the reference lines 58 is reflected by the block 28 and reference line 30, which moves the same number of graduations relative to the scales C and D. Thus, if the circular member F is moved inwardly and rotated to indicate that $5.00 has been spent on a particular major household expense, and member E has likewise been manipulated to indicate that $10.00 has been spent, this total of $15.00 expended will be reflected by the block 28 and reference line 30 which move relative to sheet C to indicate that out of an illustrative budget of $400.00, $385.00 remains to be spent. Concurrently, the line 30 is brought into alignment with graduations D to indicate that the total amount of the budget spent is $15.00. On the member F, as illustrated in FIGURE 5, it will be seen that $5.00 has been spent out of a budget of $10.00, and $5.00 remains to be spent.

The graduations 66 on each disc 64 can be so circumferentially aligned relative to graduations 56 on the circular member E, F, G, or H with which it is associated, by relative movement of the disc and plate, that when $15.00, for instance, has been indicated as being spent by manipulation of the member E, the graduations 66 on disc 64 associated with member E will show the amount of money in the budget still available for expenditure on groceries. The same is true of the discs 64 associated with the circular members F, G and H.

Figures 9, 10:
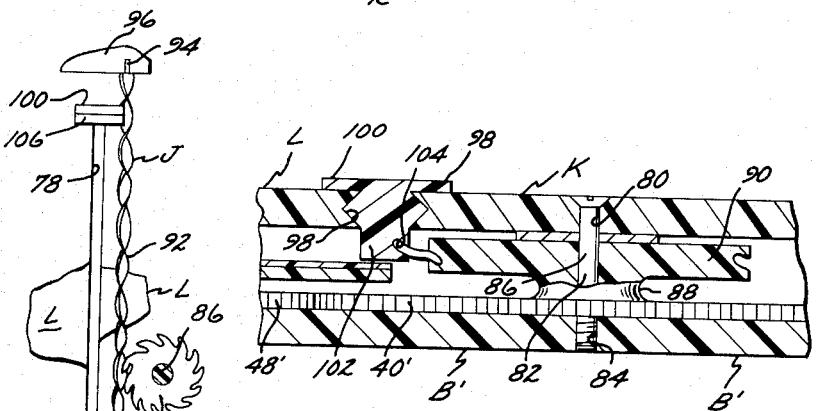
FIGURE 9 is a top plan view of an actuating mechanism utilized with a second alternate form of the device shown in FIGURE 10.
FIGURE 10 is a transverse cross-sectional view of the second alternate form of the device, showing the position therein of the actuating mechanism illustrated in FIGURE 9.

The preferred form of the computer just described may be modified by using the actuating mechanism J and structure K shown in FIGURES 9 and 10 to provide a second alternate form thereof. In modifying the preferred form of the device to the second alternate form thereof, the first plate A is removed from the preferred form and replaced by a plate L (FIGURE 9) in which a centrally disposed bore 80 (FIGURE 10) is formed, as well as an elongate slot 78 situated to one side of this bore. Plate L is of the same diameter as first plate A, and is affixed to second plate B in the same manner previously described in conjunction with the plate A.

A screw 82 extends downwardly through bore 80 to engage a tapped bore 84 formed in a second plate B' of the same general structure as plate B. The screw 82 has threads formed only on the lower portion thereof, as can best be seen in FIGURE 10. That portion 86 of the screw 82 between plates L and B' serves to rotatably support a flat gear 40' that can be engaged by any one of four gears 48'. Each of the gears 48' is identical to one of the gears 48 previously described.

Gear 40' has a centrally disposed, upwardly extending portion 88 that develops into a toothed circular member 90 which engages an elongate rigid spiral 92. The ends of spiral 92 develop into two stub shafts 94 (FIGURE 9) that are rotatably supported in two journal blocks 96. The journal blocks 96 are held at fixed positions between the plates L and B', which may be conventionally accomplished by affixing the journal blocks 96 to the interior surface of the plate L.

The slot 78 in plate L is defined by two laterally separated side walls 98 that are of angular configuration and extend outwardly from one another in opposite directions, as shown in FIGURE 10. The angular side walls 98 engage a slide block 100 that is adapted to move longitudinally in the slot 78. A portion 102 depends from block 100 in which a groove 104 is formed that engages the spiral 92. When the spiral 92 is rotated, the slide block 100 is moved longitudinally in slot 78. The slide block 100 (FIGURE 9) bears a reference line 106 on the upper surface thereof, whereby when the block is moved, the reference line is brought into alignment with the graduations on the scales C and D, in the same manner as the reference line 30 previously described. The slide block 100 and portion 102 may be formed of sections that are bonded together after being so disposed as to engage surfaces 98.

When one of the circular members E, F, G, or H is moved inwardly and rotated, the gear 48' associated therewith meshes with the gear 40' and rotates the same, and as the gear 40 rotates, the circular member 90 is concurrently rotated. Rotation of the member 90 results in rotation of the spiral 92 as illustrated in FIGURE 9, and as the spiral rotates, the slide block 100 is moved. As the slide block 100 moves, the reference line 106 thereon indicates on the scales C and D the amount of the total budget that has been spent, and that portion of the total budget remaining to be spent, in the same manner as that of the preferred form of the invention.

Figure 11:
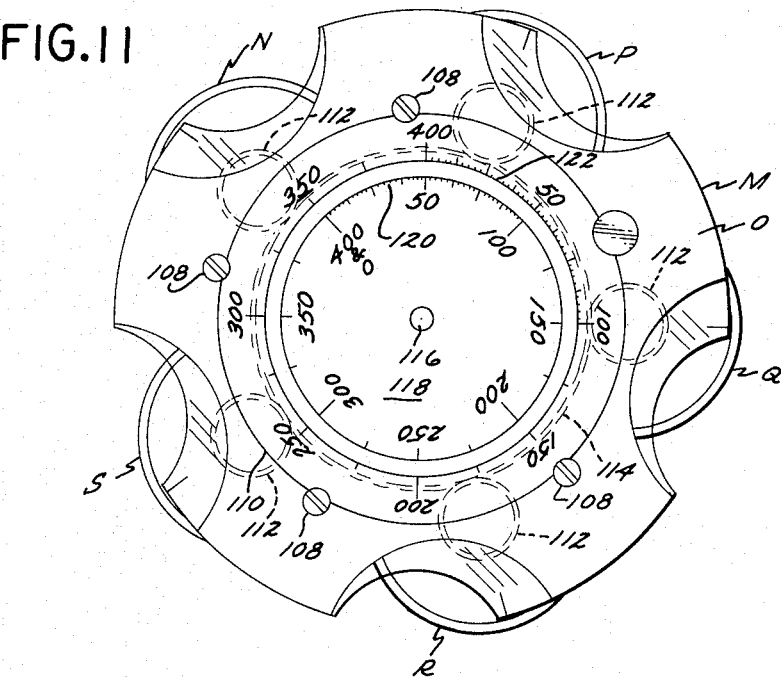
FIGURE 11 is a top plan view of a third alternate form of the computer.

An alternate form M of the device is shown in FIGURE 11, that includes an additional circular member N. The form M also includes toothed circular members P, Q, R and S which are identical to the plates E, F, G and H described in conjunction with the preferred form of the device. In the alternate form M of the device, the first plate A is replaced by a plate O that is held in fixed, parallel relationship with plate B by a number of screws 108. The screws 108 serve to removably hold a ring-shaped plate 110 on the upper surface of plate O.

Each of the circular members P, Q, R, S and N include a flat gear 112 that can be brought into engagement with a gear 114 disposed between the plates O and B. Gear 114 is rigidly affixed to a shaft 116 that is journaled in the plates O and B, and projects upwardly above plate O. The upper end of shaft 116 is rigidly connected to a disc 118 having graduations 120 imprinted on the circumferential portion thereof. Circumferentially extending graduations 122 are also imprinted on the ring-shaped plate 110.

The alternate form M of the computer is used and operates in substantially the same manner as the preferred form thereof. When one of the circular members P, Q, R, S or N is moved inwardly and rotated, shaft 116 is rotated to in turn rotate disc 118 relative to the ring-shaped plate 110, with the displacement of the graduations 120 relative to graduations 122 indicating the amount of the total budget spent and the amount remaining to be spent.

At the beginning of the budget period, and assuming that the total budget is $400.000, the "400 & 0" line of graduations 120 is brought into alignment with the "400" line of graduations 122. As the circular members N, P, Q, R and S are moved inwardly and rotated during the budget period, each of the plates causes cumulative rotation of the disc 118 in a counterclockwise direction as shown in FIGURE 11.

As illustrated in FIGURE 11, the graduations 120 have been moved relative to graduations 122 to the extent that the "400" of the graduations 120 is in alignment with "350" of the graduations 122. This indicates that $350.00 of the original $400.000 budget remains to be expended. Graduation "50" of graduations 120 is in alignment with graduation "400" of graduations 122, which indicates that $50.00 of the $400.00 budget has been spent.

Figure 4:
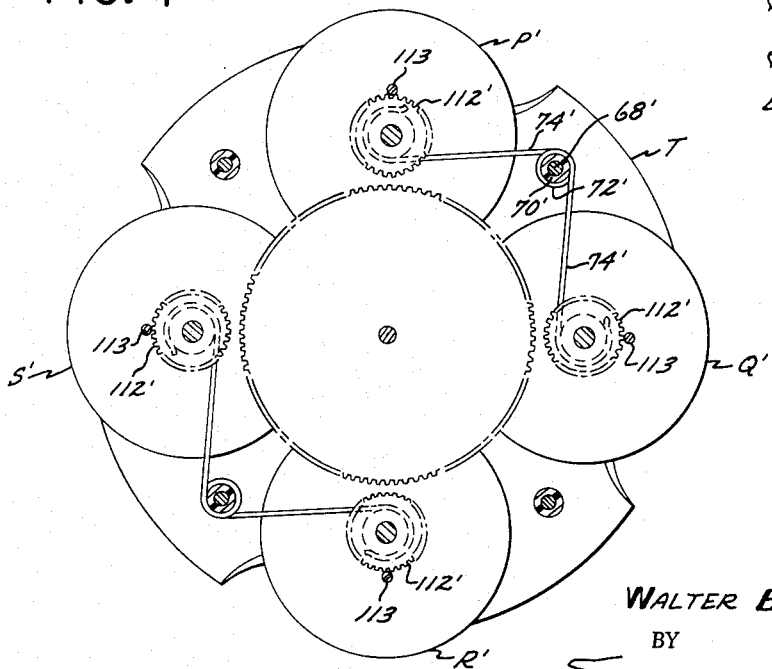
FIGURE 4 is a transverse cross-sectional view of a first alternate form of the computer.

An alternate form T of the computer is shown in FIGURE 4 which is identical in construction to the form M thereof shown in FIGURE 11, other than that the form T is provided with but four circular members P', Q', R' and S'. The alternate form T is of the same general structure and operates in the same manner as the form M. The component parts of form T which are common to form M and the preferred form of the computer are identified herein by the same numerals and letters, but primes have been added thereto. Four arresting pins 49 are shown in FIGURE 3 that engage the gears 48 when they are disposed in their normal, outwardly disposed positions to prevent inadvertent rotation thereof. Four arresting pins 113 are also shown in FIGURE 4 which prevent inadvertent rotation of gears 112'.

The circular plates E, F, G and H can be identified as to a major household expense, by rectangular plates 130, one of which is shown in FIGURE 1, that is removably held in place on plate A by two pairs of tabs 132.

The use and operation of the various forms of the invention have been explained in detail previously and need not be repeated.

Although the present invention is fully capable of achieving the objects and providing the advantages hereinbefore mentioned, it is to be understood that it is merely illustrative of the presently preferred embodiments thereof and I do not mean to be limited to the details of consruction herein shown and described, other than as defined in the appended claims.

I claim:
1. A portable household budget computer, including:
 (a) first and second spaced parallel plates;
 (b) first means for holding said first and second plates in spaced relationship;
 (c) a first graduated scale on said first plate that is used to indicate the unspent portion of said budget;
 (d) a second graduated scale on said first plate that is used to indicate the expended portion of said budget;
 (e) a plurality of graduated toothed circular plates, at least the major portions of which are disposed between said first and second plates, with each of said circular plates being rotatable and in circumferentially spaced relationship and radially movable relative to said first and second plates, each of which circular plates are identified with a particular major expense of said budget, and when rotated relative to one of a number of reference lines on said first plate indicate the portion of one of said major expenses that has been spent;
 (f) second means for supporting each of said circular plates for both rotational and radial movement relative to said first and second plates;
 (g) third means movably supported from at least one of said first and second plates for moving relative to said first and second scales to visually indicate the unspent and spent portions of the total budget; and
 (h) fourth means operatively associated with said third means to move the latter when any one of said toothed plates is moved inwardly relative to said first and second plates and rotated, which fourth means includes teeth that engage any one of said toothed circular plates when the latter is moved inwardly relative to said first and second plates and rotated.

2. A portable household budget computer as defined in claim 1 which further includes:
 (i) a plurality of graduated discs of smaller diameter than that of said toothed circular plates which overlie inner portions of said toothed plates and are in frictional engagement therewith, with said graduated discs and toothed circular plates rotating concurrently, and each graduated disc as it rotates moving relative to one of said reference lines to visually indicate the portion of the budget for one of said major expenses that remains to be expended.

3. A portable household budget computer as defined in claim 1 which further includes:
 (i) a plurality of graduated discs of smaller diameter than that of said circular plates which overlie central portions thereof; and
 (j) means for maintaining said discs in frictional contact with said plates to permit said discs to rotate concurrently therewith, with said graduations indicating the unspent portion of a major household expense classification as said discs rotate relative to said reference lines.

4. A portable household budget computer as defined in claim 1 wherein said first and second graduated scales are straight and located on opposite sides of a diametrically extending slot in said first plate, and said third means comprises a block having a transverse reference line thereon, which block moves longitudinally relative to said slot and said reference line on said block is alignable with graduations in said first and second scales.

5. A portable household budget computer as defined in claim 4 wherein said fourth means includes:
 (i) a gear rotatably supported between said first and second plates at substantially the center thereof, which gear has a cylindrical portion that extends towards said first plate in which a circumferentially extending groove is formed;

(j) an endless belt rotatably supported between said first and second plates that frictionally engages said grooved portion; and (k) a slide body movably supported in said slot that is affixed to said belt and to said block, with said block, body, and said belt being concurrently moved when one of said toothed circular plates is moved inwardly to engage said gear and thereafter rotated.

6. A portable household budget computer as defined in claim 4 wherein said fourth means includes:

(i) a toothed member rotatably supported between said first and second plates at substantially the center thereof;

(j) an elongate spiral rotatably supported between said first and second plates and substantially parallel thereto that engages said toothed member;

(k) a portion that projects downwardly through said slot from said block to movably engage said spiral; and (l) a gear disposed between said first and second plates that is affixed to said toothed member, which member and gear affixed thereto are concurrently rotated when one of said toothed circular plates is moved inwardly to engage said gear and thereafter rotated, with said toothed member as it rotates moving said block and downwardly extending portion thereof longitudinally in said slot.

7. A portable household budget computer, including:

(a) first and second spaced parallel plates;

(b) first means for holding said first and second plates in spaced relationship;

(c) a ring-shaped plate that rests on said first plate, which ring-shaped plate is provided with graduations along a circumferential edge portion thereof;

(d) a disc that rests on said first plate and is disposed within said ring-shaped plate, which disc is provided with graduations on the circumferential edge portion thereof;

(e) first means for adjustably holding said ring-shaped plate on said first plate;

(f) a shaft affixed to said disc that is rotatably supported in an opening in said first plate;

(g) a gear disposed between said first and second plates that is affixed to said shaft;

(h) a plurality of graduated toothed circular plates, at least the major portions of which are disposed between said first and second plates, with each of said circular plates being rotatable in circumferentially spaced relationship and radially movable relative to said first and second plates, each of which circular plates are identified with a particular major expense classification of said budget, and when rotated relative to one of a number of reference lines on said first plate indicate that portion of one of said major expense classifications that has been spent; and (i) second means for supporting each of said circular plates for both rotational and radial movement relative to said first and second plates, with each of said circular plates when moved inwardly to engage said gear and rotated moving said disc for a predetermined one of said graduations thereon to indicate on said graduations on said ring-shaped plate the unexpended portion of the total budget and with a predetermined one of said graduations on said ring-shaped plate indicating on said graduations on said disc that portion of said budget that has been expended.

No references cited.

LEO SMILOW, *Primary Examiner.*